I. D. THORNBURGH.
AUTOMATIC WEIGHING MECHANISM.
APPLICATION FILED JAN. 4, 1916.
1,247,903.
Patented Nov. 27, 1917.
2 SHEETS—SHEET 1.
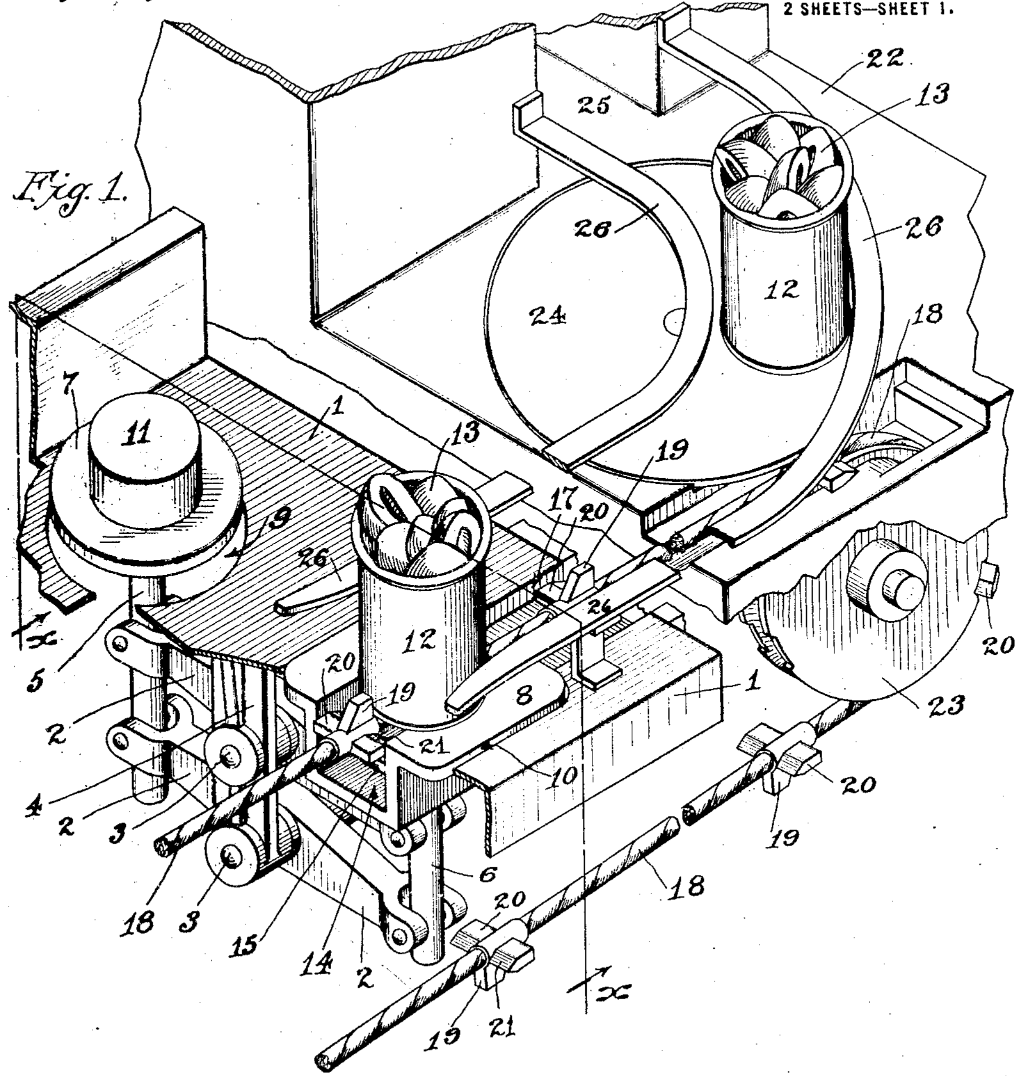
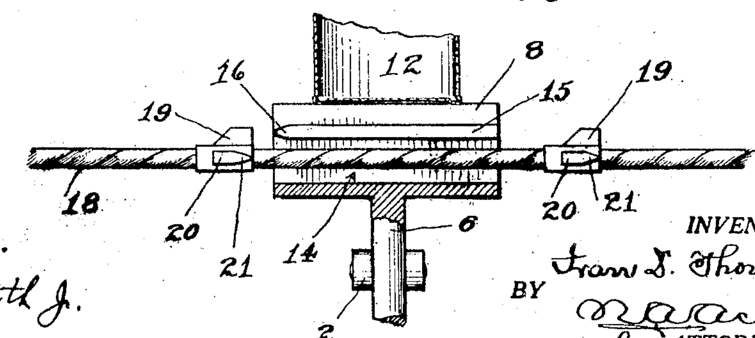
WITNESS.
W. F. Booth Jr.
INVENTOR.
Ivan D. Thornburgh
BY
[signature]
his ATTORNEY.

I. D. THORNBURGH.
AUTOMATIC WEIGHING MECHANISM.
APPLICATION FILED JAN. 4, 1916.
1,247,903. Patented Nov. 27, 1917.
2 SHEETS—SHEET 2.
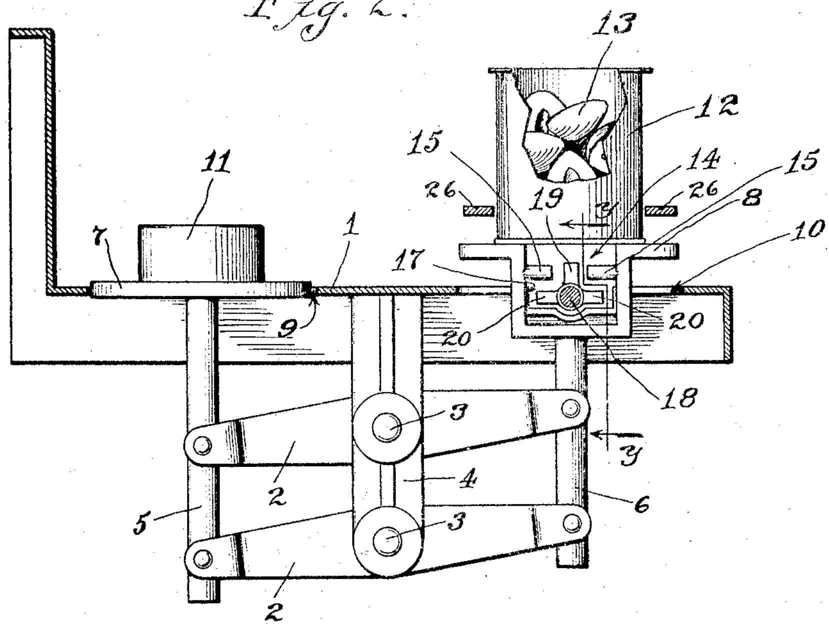
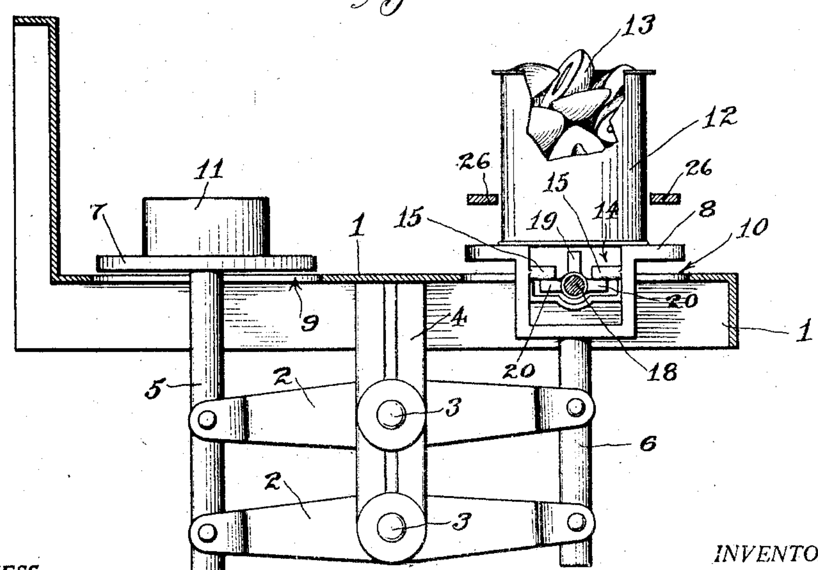
WITNESS.
W. F. Booth Jr.
INVENTOR.
Ivan D. Thornburgh
BY
B. A. Acker
his ATTORNEY.

UNITED STATES PATENT OFFICE.

IVAN D. THORNBURGH, OF OAKLAND, CALIFORNIA, ASSIGNOR TO AMERICAN CAN COMPANY, OF SAN FRANCISCO, CALIFORNIA, A CORPORATION OF NEW JERSEY.

AUTOMATIC WEIGHING MECHANISM.

1,247,903. Specification of Letters Patent. Patented Nov. 27, 1917.

Application filed January 4, 1916. Serial No. 70,314.

*To all whom it may concern:*

Be it known that I, IVAN D. THORNBURGH, a citizen of the United States, residing at Oakland, in the county of Alameda and State of California, have invented certain new and useful Improvements in Automatic Weighing Mechanism, of which the following is a specification.

The present invention relates to the class of automatic weighing devices, and more particularly to an apparatus for weighing cans or containers filled with food products or other materials, and for automatically removing the same out of the sphere of the weighing device.

Where it is necessary to fill a container with a certain weight of material, as for example, in the canning of fruit or other food products, it is customary to place the empty container on the platform of a balance or other weighing device, fill said container to the desired weight, and then remove the same from the scale platform. This is true particularly in the canning of fruit, where, to avoid any unnecessary handling, the fruit is cut directly into the can. This moving of the container on and off the scale platform involves considerable additional labor, with a consequent loss of time.

The object of the present invention, therefore, is to provide a device of the described type by which an object is weighed and automatically removed from the weighing mechanism when the weight of said object reaches the proper limit.

Inasmuch as the device is particularly adapted to the weighing of cans, in connection with the filling thereof, it will be so described hereinafter, and is so illustrated in the accompanying drawings. It is to be understood, however, that the device is adaptable to the automatic weighing of any object, and may be used in any connection in which a machine of the described type is available.

In order to comprehend the invention, reference should be had to the accompanying drawings, in which—

Figure 1 is a perspective view of the weighing mechanism, part broken away, showing a filled can being removed from the device, and another about to be removed from the scale platform.

Fig. 2 is a sectional elevation taken in a plane represented by the line *x—x* of Fig. 1 of the drawings, viewed in the direction of the arrows, showing a partly filled container on the scale platform.

Fig. 3 is a view similar to Fig. 2, showing the container filled, and the scale platform being supported by the conveyer cable, as hereinafter described.

Fig. 4 is a sectional detail, taken in the direction of the arrows on the line *y—y* of Fig. 2.

In the drawings, the numeral 1 represents a suitably constructed table or supporting plate for the weighing device, the latter consisting in its preferred form, of a pair of double levers 2, Figs. 1, 2 and 3 of the drawings, fulcrumed at 3 to a bracket 4 depending from the table 1, and having pivotally mounted to their ends the vertical rods 5 and 6, said rods supporting the scale or balance platforms 7 and 8 respectively, working in apertures 9 and 10 in the table 1. The platform 7 is adapted to carry a weight 11, sufficient to balance the weight of the container 12 upon the platform 8, when filled with the desired quantity of material 13.

The platform 8 is formed as shown in the drawings with a groove or recess 14 therein, projecting inwardly from the side walls of which are the oppositely disposed lugs 15, Figs. 2, 3 and 4 of the drawings, one end of which is tapered or pointed as shown at 16 in Fig. 4 of the drawings. The table 1 is also formed with a groove 17, Figs. 1 and 2 of the drawings, alined with the groove 14 in the scale platform 8. A conveyer, herein shown as a flexible rope or cable 18, is positioned to run in these alined grooves, said conveyer being for the purpose of removing the filled containers from the scale platform 8 and conveying the same to any desired place of deposit.

The conveyer 18 is provided at intervals with upstanding flights 19, each of which is provided with a pair of oppositely disposed laterally extending wings 20, the forward ends thereof being tapered or pointed, as shown at 21 in Figs. 1 and 4 of the drawings. When the scale platform 8 is in its elevated position, as shown in Figs. 2 and 4 of the drawings, the wings 20 pass beneath the lugs 15, and the flights 19 run under the container 12 without engaging therewith. When, however, the weight on the scale platform 8 is sufficient to lower the same, if one of the conveyer flights 19 happens at that moment to be beneath the container 12, the lugs 15, coming into contact with the wings 20 on said flight 19, support the platform 8 so that the container 12 remains free of said flight 19, as shown in Fig. 3 of the drawings. When the wings 20 pass from beneath the lugs 15, the platform 8, by reason of the weight of the filled container thereon, drops to the position shown in Fig. 1 of the drawings. and the following conveyer flight 19 engages the container 12 and moves the same off the platform 8. The wings 20 now pass over the lugs 15, and by so doing prevent the platform 8 from rising before the container 12 is entirely free therefrom.

In the preferred embodiment of the invention herein illustrated, I have shown a conveyer mechanism for removing the filled containers from the sphere of the weighing apparatus, the same comprising an apertured bed plate or table 22 providing a suitable journal support for a pulley 23 over which the conveyer cable 18 is adapted to run. A horizontal rotary conveyer plate 24, set within the aperture of and flush with the surface of the table 22. receives the containers 12 as thev are moved thereonto by the cable 18, and advances them toward the discharge outlet 25. Suitably disposed spaced fixed guide rails 26 are provided to guide the containers in their proper path toward the discharge outlet 25 of the machine.

I do not wish to be understood as limiting the invention by the following claims to the particular form of my device herein illustrated and described, since changes may be made therein without in any way departing from the spirit of the invention, but on the contrary, I wish to claim the invention as broadly as the state of the art will permit, the same comprising inter-related working instrumentalities for automatically weighing containers as filled and removing the container when filled to proper weight from the weighing mechanism and conveying the same to a suitable place of deposit.

Having thus described my invention, what I claim as new and desire to protect by Letters Patent is:—

1. An automatic weighing mechanism comprising a vertically movable platform adapted to receive an object to be weighed and to be depressed by the weight thereof, and endless moving means provided with engaging projections and associated with said platform for engaging with and automatically removing said object therefrom when said platform is depressed a pre-determined distance.

2. An automatic weighing mechanism comprising a vertically movable platform adapted to receive an object to be weighed and to be depressed by the weight thereof, and endless conveying means associated with said platform and having engaging projections for automatically removing said object therefrom when said platform is depressed a pre-determined distance.

3. An automatic weighing mechanism comprising a movable platform adapted to receive an object to be weighed and to be depressed by the weight thereof, endless conveying means associated with said platform and having engaging projections for automatically removing said object therefrom when said platform is depressed a predetermined distance, and devices carried bv said conveying means for holding said platform so depressed while said object is being removed therefrom.

4. An automatic weighing mechanism comprising a movable platform adapted to receive an object to be weighed and to be depressed by the weight thereof, endless conveying means associated with said platform and having engaging projections for automatically removing said object therefrom when said platform is depressed a pre-determined distance, and interworking devices for holding said platform so depressed while said object is being removed therefrom.

5. In an automatic weighing mechanism, the combination with a balance having a platform adapted to receive an object to be weighed, and to be depressed a pre-determined distance by the weight thereof, of endless conveying means having engaging projections for automatically removing said object from said platform when the same is so depressed.

6. In an automatic weighing mechanism, the combination with a balance having a platform adapted to receive an object to be weighed, and to be depressed by the weight thereof, of conveying means for removing said object from said platform when the same is depressed a pre-determined distance, and devices carried by said conveying means for holding said platform so depressed while said object is being removed therefrom.

7. In an automatic weighing mechanism, the combination with a balance having a platform adapted to receive an object to be weighed, and to be depressed by the weight thereof, said platform being formed with a groove in its surface, of a traveling conveyer operating within said groove, and means carried by said conveyer for removing said object from said platform when the same is depressed.

8. In an automatic weighing-mechanism, the combination with a balance having a platform adapted to receive an object to be weighed, and to be depressed by the weight thereof, said platform being formed with a groove in its surface, of a traveling conveyer operating within said groove, means carried by said conveyer for removing said object from said platform when the same is depressed a given distance, and interworking devices carried by said platform and said conveyer for holding said platform so depressed while said object is being removed therefrom.

9. In an automatic weighing mechanism, the combination with a balance having a platform adapted to receive an object to be weighed, and to be depressed by the weight thereof, said platform being formed with a groove in its surface and spaced oppositely disposed lugs projecting inwardly from the walls of said groove, of a traveling conveyer operating within said groove, an upwardly extending flight carried by said conveyer adapted to engage said object to remove the same from the depressed platform, and laterally extending wings carried by said conveyer to engage with said lugs to prevent the depression of said platform while said flight is beneath said object, and to hold said platform depressed while said object is being removed therefrom by said flight.

10. An automatic weighing mechanism comprising a pair of balanced interconnected scale platforms, one adapted to receive a known weight and the other adapted to receive an object to be weighed, and to be depressed by the weight thereof, and endless traveling conveying means having engaging projections and associated with said object receiving platform for removing the object therefrom when said platform is depressed.

11. An automatic weighing mechanism comprising a pair of balanced interconnected scale platforms, one adapted to receive a known weight and the other adapted to receive an object to be weighed, and to be depressed by the weight thereof, endless traveling conveying means having engaging projections and associated with said object receiving platform for removing the object therefrom when said platform is depressed, and interworking devices carried by said conveying means and said platform to hold the same depressed while said object is being removed therefrom.

12. An automatic weighing mechanism comprising a pair of inter-connected scale platforms, one of which is adapted to receive a known weight and the other adapted to receive an object to be weighed, and to be depressed thereby for balancing the opposing weighted scale platform, and endless traveling means having engaging projections and associated with said object receiving scale platform for automatically removing the object therefrom on the weight thereof balancing the weighted scale platform.

13. In an automatic weighing mechanism, the combination with a balance scale platform adapted to receive an object to be weighed and to be depressed by the weight thereof a pre-determined distance, of endless traveling means having engaging projections and associated therewith for holding the platform in its depressed position while the weighed object is engaged and removed therefrom.

14. In an automatic weighing machine, the combination with a weighing platform adapted to receive an object to be weighed and be depressed a pre-determined distance thereby, of associated endless traveling means having engaging projections for automatically removing the weighed object from the said platform when in its depressed position.

In testimony whereof I have signed my name to this specification in the presence of two subscribing witnesses.

IVAN D. THORNBURGH.

Witnesses:
H. F. Booth, Jr.,
D. B. Richards.

Copies of this patent may be obtained for five cents each, by addressing the "Commissioner of Patents, Washington, D. C."